United States Patent
Abbiati (10) Patent No.: US 11,467,361 B2
(45) Date of Patent: Oct. 11, 2022

(54) HIGH DENSITY SPLICE HOLDER TRAY

(71) Applicant: Prysmian S.p.A., Milan (IT)

(72) Inventor: Fabio Abbiati, Milan (IT)

(73) Assignee: Prysmian S.p.A., Milan (IT)

( * ) Notice: Subject to any disclaimer, the term of this patent is extended or adjusted under 35 U.S.C. 154(b) by 254 days.

(21) Appl. No.: 16/880,848

(22) Filed: May 21, 2020

(65) Prior Publication Data

US 2020/0371290 A1  Nov. 26, 2020

(30) Foreign Application Priority Data

May 22, 2019  (IT) ................ 102019000007084

(51) Int. Cl.
*G02B 6/44* (2006.01)
*G02B 6/255* (2006.01)

(52) U.S. Cl.
CPC ......... *G02B 6/4454* (2013.01); *G02B 6/4471* (2013.01); *G02B 6/2556* (2013.01); *G02B 6/444* (2013.01)

(58) Field of Classification Search
CPC .... G02B 6/2556; G02B 6/444; G02B 6/4454; G02B 6/4471
See application file for complete search history.

(56) References Cited

U.S. PATENT DOCUMENTS

| | | | |
|---|---|---|---|
| 5,185,845 A | 2/1993 | Jones | |
| 5,422,974 A | 6/1995 | Brown et al. | |
| 5,835,657 A * | 11/1998 | Suarez | G02B 6/4452 385/135 |
| 7,272,291 B2 * | 9/2007 | Bayazit | G02B 6/4454 385/137 |
| 8,861,919 B2 * | 10/2014 | Alston | G02B 6/4442 385/99 |
| 8,913,868 B2 * | 12/2014 | Hangebrauck | G02B 6/4454 385/137 |

FOREIGN PATENT DOCUMENTS

| | | | | |
|---|---|---|---|---|
| EP | 2960698 A1 | 12/2015 | | |
| WO | WO-2009048795 A1 * | 4/2009 | ........... | G02B 6/4454 |

* cited by examiner

*Primary Examiner* — Ryan A Lepisto
(74) *Attorney, Agent, or Firm* — Slater Matsil, LLP (57) ABSTRACT

A splice holder tray has a splice holder section that includes a plurality of inclined channels. Each of the plurality of inclined channels includes a first portion presenting a cross section area that is measured on a reference plane, two opposite lateral openings, and a top opening and a bottom opening. The bottom opening has an area smaller than the cross section area.

20 Claims, 5 Drawing Sheets

HIGH DENSITY SPLICE HOLDER TRAY

CROSS-REFERENCE TO RELATED APPLICATIONS

This application claims priority to Italian Patent Application No. 102019000007084 filed on May 22, 2019, which application is hereby incorporated herein by reference.

TECHNICAL FIELD

The present invention relates to the field of fiber management system in optical access networks. In particular, the present invention relates to a high density splice holder tray.

BACKGROUND

Optical networks generally called FTTX, such as FTTH (Fiber To The Home), FTTP (Fiber To The Premises), FTTB (Fiber To The Building), FTTC (Fiber To The Cabinet), are optical access networks providing a number of end customers with broadband communication services from operators, i.e. with services requiring data transmission at a very high rate, for example of some Mbit/s.

A FTTX network comprises a central office which is connected with one or more street cabinets and/or optical distribution boxes, through an optical cable commonly known as network cable.

To be able to properly identify and to splice a particular optical fiber in a central office, in a street cabinet or in optical distribution boxes, where there may be hundreds of optical fibers, a fiber management system is necessary.

Splice holder trays are commonly used in fiber management systems for organizing, storing, splicing and retaining spliced optical fiber splices.

A method of splicing two optical fibers is fusion splice wherein the two optical fibers are fused together. The two optical fibers are placed in a fusion splicer machine and accurately aligned following which an electric arc is discharged at the ends of the optical fibers to melt the glass and fuse the two optical fibers together. Prior to the splicing operation a protective sleeve is slid over one of the optical fibers and shifted to a position out of the way of the splice region, and after the splice is made the protective sleeve is slid over the splice and thermo-shrinked to protect the same.

The splice needs to be properly supported within the splice holder tray in order to prevent the splice and the optical fibers from being damaged.

Among the known splice holder trays are high density splice holder trays which can hold more than one splice, typically a plurality of splices. In the high density splice holder trays, splices can be stacked in splice holder sections.

Document EP 2960698 B1 discloses a high density splice holder tray for splice protectors protecting splices between optical fibers provided by single fiber splicing. The disclosed splice holder tray comprises a first splice holder section configured to hold a plurality of heat shrink splice protectors in an arrangement of a plurality of sloped columns of stacked heat shrink splice protectors and a second splice holder section configured to hold a plurality of crimp splice protectors in an arrangement of a plurality sloped columns of stacked crimp splice protectors. The first splice holder section and the second splice holder section are connected together by elements providing predetermined breaking points so that the first splice holder section and the second splice holder section are separable from each other by breaking one of the sections from the other section along the breaking points.

Document U.S. Pat. No. 5,835,657 discloses a high density splice holder tray having splice holder sections comprising two generally parallel side walls, first and second end walls and a generally planar base, the side walls and end walls extending substantially perpendicular to the base. The splice holder may include a combination of one or more: lateral pivot assemblies; longitudinal hinge assemblies; alignment bosses; buffer tube receiving channels having a buffer tube retainer; insert retention socket and insert; splice block; tier bracket hinge assembly and interlocking assembly to assist in aligning and securing a plurality of such splice holders together and to secure buffer tubes within the splice holder and assist in optical fiber dressing within the splice holder.

SUMMARY

In one embodiment, a splice holder tray comprises a splice holder section that comprises a plurality of inclined channels. Each of the plurality of inclined channels includes a first portion presenting a cross section area that is measured on a reference plane, two opposite lateral openings, and a top opening and a bottom opening. The bottom opening has an area smaller than the cross section area.

In one embodiment, a splice holder tray comprises a storage section comprising optical cable tracks for optical cables to be spliced to enter the storage section. A splice holder section comprises a plurality of inclined channels for holding spliced optical fibers. Each of the plurality of inclined channels includes a first portion presenting a cross section area that is measured on a reference plane, two opposite lateral openings for exiting the spliced optical fibers, and a top opening and a bottom opening. The bottom opening has an area smaller than the cross section area. The splice holder tray further comprises routing sections to route the optical cable tracks from the storage section to the splice holder section.

BRIEF DESCRIPTION OF THE DRAWINGS

The present invention will be now described in more detail hereinafter with reference to the accompanying drawings, in which some, but not all embodiments of the invention are shown.

Drawings illustrating the embodiments are not to scale representations.

For the purpose of the present description and of the appended claims, use of the "a" or "an" are employed to describe elements and components of embodiments of the invention. This is done merely for convenience and to give a general sense of embodiments of the invention. This description should be read to include one or at least one and the singular also includes the plural unless it is obvious that it is meant otherwise.

DETAILED DESCRIPTION OF ILLUSTRATIVE EMBODIMENTS

The Applicant has observed that as the number of fiber splices increases in a given central office, in a given street cabinet, or in a given optical distribution box, it often becomes necessary to add additional splice holder trays to the central office, to the street cabinet, or to the optical distribution box.

The Applicant has observed that by mounting the known splice holder trays superposed with each other, it is possible to add a plurality of splice holder trays into a given central office or into a given optical distribution box.

The applicant has further observed that by hinging each splice holder tray to a mounting support it is possible to enable the individual splice holder trays to be pivoted about their respective hinge axes to provide access to the splice holder trays. In this way it is possible to maximize the number of splice holder trays that can be mounted into a given storage space.

However, space within central offices, street cabinets, and optical distribution boxes where such splices are housed is limited and in some situations the number of splice holder trays is insufficient for enabling each splice to be properly supported.

The Applicant has thus tackled the problem of providing a high density splice holder tray that maximizes the number of supported splices within a storage space.

The Applicant has observed that, given the number of splices held by a splice holder tray, the number of splice holder trays should be maximized in order to maximize the number of supported splices.

The Applicant has observed that to maximize the number of splice holder trays, the thickness of the splice holder trays should be minimized.

Consistently, embodiments of the present invention relate to a high density splice holder tray having a splice holder section comprising a plurality of inclined channels each of which having a first portion presenting a cross section area, two opposite lateral openings, a top opening and a bottom opening, wherein the bottom opening has an area smaller than the cross section area.

By providing the first portion of the inclined channel with the cross section area substantially equal to the maximum cross section area of the splice, the first portion of the inclined channel is suitable for slidingly accommodating one or more splices (depending on the extent of the first portion in a direction perpendicular to the cross section area).

The two opposite lateral openings are spaced apart from a distance substantially identical to the extent of the shrinkable sleeve that protect the splice, so that the two spliced optical fibers can leave laterally the inclined channel. The top opening of the inclined channel allows the splice or splices to be inserted into the inclined channel.

The Applicant has realized that by providing a bottom opening in the inclined channel and by dimensioning the bottom opening so that it has an area smaller than the cross section area of the first portion of the inclined channel, the splice or splices inserted into the inclined channel are prevented from leaving the inclined channel from the bottom opening.

The Applicant has realized that the provision of such a bottom opening avoids the need of any bottom base wall for supporting the splices inserted into the inclined channel, so reducing the thickness of the splice holder tray.

Moreover, the Applicant has realized that by dimensioning the bottom opening so that a bottom splice slightly protrudes from the bottom opening, it is possible to further reduce the thickness of the splice holder tray.

Indeed, the Applicant has observed that each splice holder tray in a row of superposed splice holder trays is usually spaced from the above and from the below holder splice tray by a small gap, for example of about 0.5 millimeters. This gap provides for a tolerance that guarantees each splice holder tray to properly pivot with respect to the others.

The Applicant has realized that by letting a bottom splice to emerge from the bottom aperture by a length substantially equal to such a gap, the functionality of the splice holder tray is not affected and its thickness can be further reduced by shortening the length of the inclined channel.

Throughout this description and in the following claims, the expressions "optical fiber" is used to indicate an elongated optical element comprising an optical waveguide, constituted by an optically transmissive core, surrounded by a cladding. The optical waveguide is preferably covered by at least one protective coating layer. Two protective coating layers are preferably provided: a first coating layer (primary coating) is in direct contact with the optical waveguide, while a second coating layer (secondary coating) covers the primary coating. In addition, a buffer layer may cover the optical fiber. The buffer layer may be substantially in contact with the secondary coating (tight buffer) or it may consist of a small tube housing one or more optical fibers (loose buffer).

Throughout this description and in the following claims, the expressions "splice" or "fusion splice" is used to indicate the join between two optical fibers and the related heat shrinkable sleeve (with typically a metal pin/rod inside) that protects the join from excessive bending and pulling forces. The splice is obtained by stripping away all the protective coating layers and the cladding. Once only bare glass remains, the optical fibers are cleaned and cleaved. Then the optical fiber ends are aligned, so that light can pass from one optical fiber to the other with a minimum of loss, reflection or distortion. Once the fibers are aligned, they are fused or burned together by generating a high-voltage electric arc that melts the fiber tips, which are then pushed or fed together. A heat shrinkable sleeve, previously slid over one of the optical fibers, is shifted on the splice region and heated (shrinked) to protect the same.

In some embodiments, the bottom opening extends between the two opposite lateral openings of each inclined channel.

This allows the splice to emerge along its entire length from the bottom of each inclined channel.

Preferably, each inclined channel further comprise a second portion and a third portion wherein the first portion is adjacent to the second and to the third portion; the bottom opening being provided on the second portion.

The third portion is positioned above the first portion and the first portion is positioned above the second portion. The third portion realizes a top region of the inclined channel, the first portion realizes a central region of the inclined channel and the second portion realizes a bottom region of the inclined channel.

Preferably, the first portion of the inclined channel is delimited by a first wall and a second wall parallel each other and extending along a first direction; the cross section area being measured along a reference plane perpendicular to the first direction.

In some embodiments, the first portion of the inclined channel is dimensioned so that the distance between the first and second wall, measured along a direction laying in the reference plane and perpendicular to the first direction, correspond to the diameter of the shrinkable protective sleeve of the splice. The splice or splices inserted from the third portion into each inclined channel can slide along the first portion and can reach the second portion.

Preferably, at least a part of the inclined channel is tapered at the second portion.

The tapered part of the second portion realizes a narrowing in the inclined channel that prevents the inserted splices to slide along the second portion and thus to be retained in the first portion of the inclined channel.

The tapered part of the second portion can continuously extend between the two opposite lateral openings or can extend for just a portion of the distance between the two opposite lateral openings.

In some embodiments, at least two parts of the inclined channel, spaced apart to each other between the two opposite lateral openings, are tapered at the second portion.

In some embodiments, the second portion is delimited by a third wall extending from the first wall along a second direction inclined with respect to the first direction. The splice retained in the first portion of the inclined channel leans against the third wall and is prevented from further sliding along the first portion. The third wall realizes the mentioned tapering.

In some embodiments, the third wall has a projected length on the reference plane that is slightly smaller than an half of the distance L1.

By selecting the projected length of the third wall on the basis of the inclination of the inclined channel, it is possible to predetermine the portion of the splice that protrudes from the bottom opening.

Preferably, it is provided a plurality of partition walls each of which is provided between an inclined channel and an adjacent inclined channel.

The partition walls separate the inclined channels each other and extend between the first wall of a inclined channel to the second wall of an adjacent channel.

In some embodiments, the thickness of each partition wall measured along a direction perpendicular to the first direction is smaller than the distance between the first and second wall of an inclined channel measured along the same direction.

The thickness of each partition wall is preferably measured along a direction parallel to the first direction. The thickness of a partition wall can be defined as the distance between the first wall of an inclined channel and the second wall of an adjacent channel.

Preferably, each partition wall is elastically deformable at least at the third portion of the inclined channel. In this way, the partition walls can be deformed to broaden the top opening of the inclined channels, so as to allow inserting the splices into the inclined channels. After the splices insertion, the partition walls can regain their original shape. This allows to retain the splices into the inclined channels and prevents the splices from accidentally leave the inclined channels from the top openings.

In some embodiments, the third portion of the inclined channel comprises at least one tapered part. The tapered part is provided on the elastically deformable partition wall.

In some embodiments, there are provided a plurality of tapered parts at the third portion of the inclined channel, preferably spaced apart each other along the top opening.

Preferably, the tapered part of the third portion is delimited by a fourth wall extending from the second wall along a third direction inclined with respect to said first direction.

The fourth wall is designed so that, after the splices are inserted into the inclined channel, the top splice abuts against the fourth wall and is prevented from exiting the inclined channel.

Preferably, at least the first wall comprises at least one protrusion projecting toward the second wall.

In some embodiments it is provided a storage section, configured for storing lengths of optical fibers, and two opposite routing sections positioned between the splice holder section and the storage section.

In the storage section, extra-length portions of optical fibers of a first and second optical cable are wound. The routing sections allow the lengths of optical fibers leaving the splice section to reach the storage section. The routing sections gently bend the lengths of optical fibers before reaching the storage section.

In particular, embodiments of the present invention relate to a high density splice holder tray for securing and retaining fiber optic splices which accommodates a high density of splices. The optic splices are fusion splices.

Figure 1:
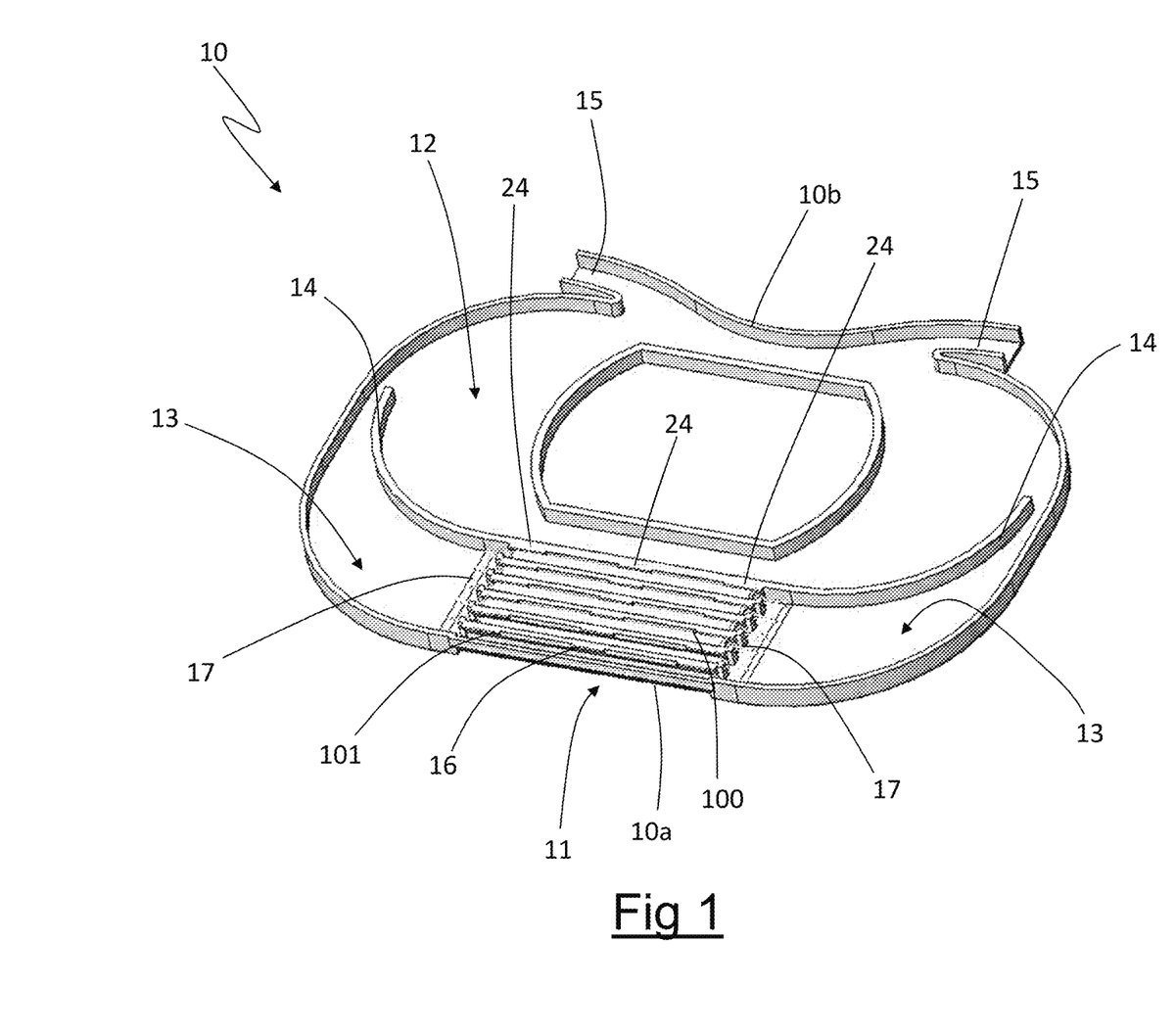
FIG. 1 shows a schematic perspective top view of a high density splice holder tray according to an embodiment.

A high density splice holder tray according to embodiments of the present invention is indicated with the reference number 10 in FIG. 1.

The high density splice holder tray 10 comprises a splice holder section 11, a storage section 12 and two routing sections 13 each extending between the splice holder section 11 and the storage section 12, as depicted on FIG. 1.

The splice holder section 11 is configured for retaining a plurality of splices 100 between optical fibers (not shown). The splices 100 are fusion splices and comprises a respective shrinkable protective sleeve 101 (possibly with a metal pin/rod inside) wrapping the junction section between the two optical fibers.

Each shrinkable protective sleeve 101 has a generally cylindrical shape and presents a diameter preferably comprised between about 2.2 millimeters and about 2.6 millimeters, more preferably of about 2.4 millimeters. In some embodiments, the diameter of the shrinkable sleeve 101 can be of about 1.3 millimeters. The shrinkable protective sleeve 101 comprises two opposite end surfaces from which the two spliced optical fibers enter the shrinkable protective sleeve bob.

The splice holder section 11 is preferably positioned at a frontal portion 10*a* of the splice holder tray 10. A dividing wall 14 separates the splice holder section 11 from the storage section 12. The dividing wall 14 extends laterally from the splice holder section 11 and defines the two routing sections 13 that connect the splice holder section 11 with the storage section 12.

The function of the storage section 12 is to accommodate extra-length of the spliced optical fibers and the function of the routing sections 13 is to gently route the optical fibers emerging from the splices toward the storage section 12. The storage section 12 can comprise two optical cable tracks 15 that allow two optical cables (not illustrated), the optical fibers of which need to be spliced, to enter the storage section 12. The optical cable tracks 15 are positioned at a rear portion bob of the splice holder tray 10.

The high density splice holder tray 10 is suitable for being used in FTTX network. Preferably, the high density splice holder tray 10 is intended to be arranged into a central office, into a street cabinet, or into an optical distribution box. A plurality of high density splice holder trays 10 can be arranged superposed each other, can be pivotally connected to a supporting frame and can lie in respective parallel planes. The stack of splice holder trays 10 extends vertically and when the splice holder trays 10 are not accessed by the installer for operating thereon, each splice holder tray 10 usually lies in a plane containing a pivot axis (provided at the rear portion 10*b* of the splice holder tray 10) and angled downwardly (typically by an angle comprised between 40° and 50° with respect an horizontal plane).

In the case an installer needs to work on a splice holder tray 10, the latter can be flipped up to expose the underneath splice holder tray 10.

Similarly, all the other splice holder trays 10 in the stack can be flipped up so that any of the splice holder tray 10 can be accessed. This allows an installer, who is requested to route and splice further optical fibers within a specific splice holder tray 10, to easily access the desired splice holder tray 10 by flipping up the splice holder tray 10 which are positioned above the desired one.

Preferably, each splice holder tray 10 is spaced apart from the above and the underneath splice holder tray 10 by a distance comprised from about 0.3 millimeters to about 0.5 millimeters.

Figure 4:
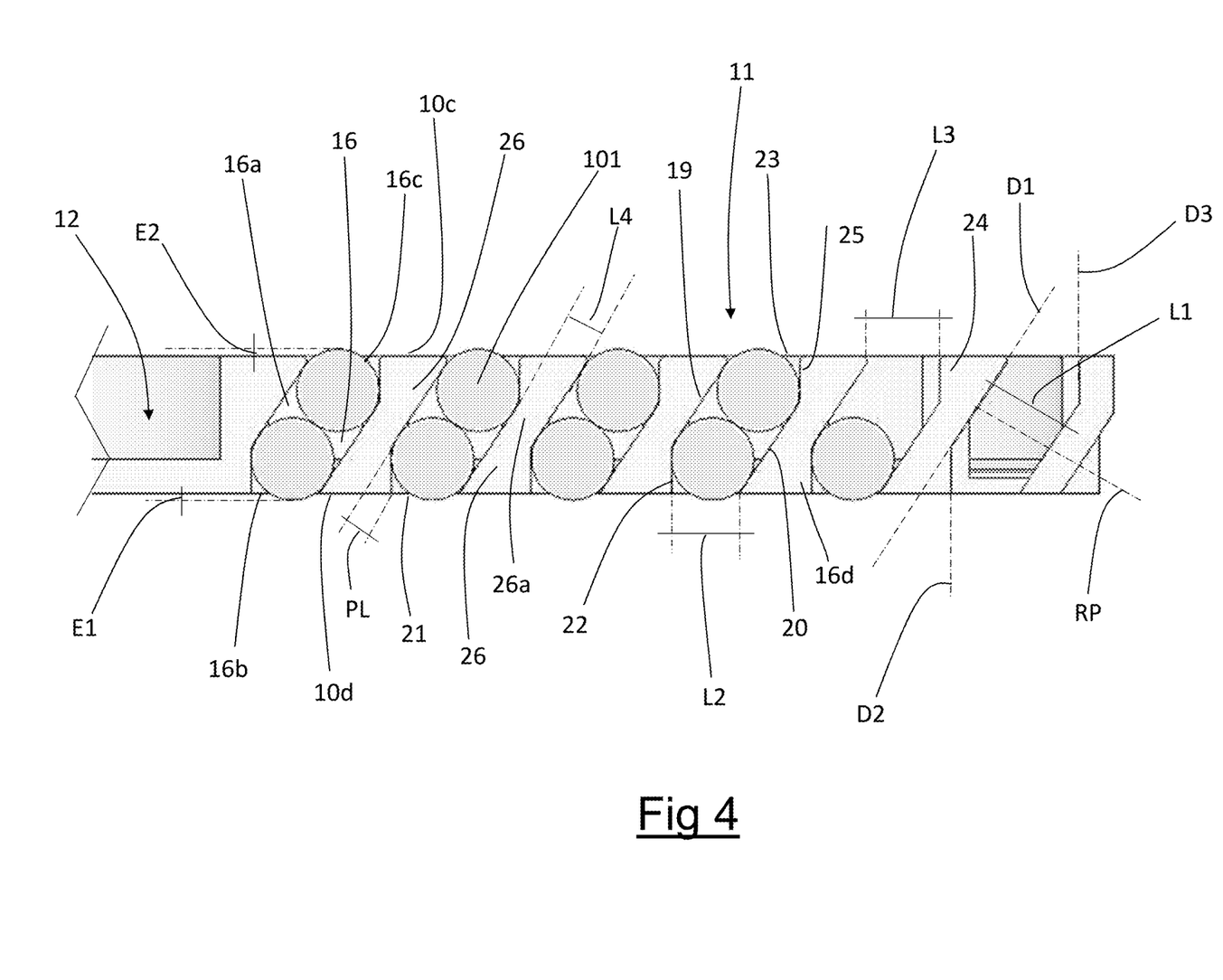
FIG. 4 shows a schematic section view along the plane IV-IV of the portion of the high density splice holder tray of FIG. 3 according to an embodiment.

The splice holder section 11 comprises a plurality of inclined channels 16 extending from a top 10*c* to a bottom 10*d* of the splice holder tray 10. The inclined channels 16 present a main development direction, from the top 10*c* to the bottom 10*d* of the splice holder tray 10, substantially parallel to a first direction D1 that is angled with respect to a vertical plane (FIG. 4). The inclined channels 16 are parallel each other.

The inclined channels 16 are designed for receiving and retaining a plurality of splices 100. In the embodiment illustrated, each channel 16 receives two splices 100. In other embodiments not illustrated, each channel 16 can receive one splice 100 or a number of splices 100 greater than two.

Each inclined channel 16 extends perpendicularly to the first direction D1 between two opposite lateral sides 17 which presents respective lateral openings 18. The two lateral openings 18 allow the two spliced optical fibers to exit from the inclined channels 16 and to enter the routing section 13. The extent of each inclined channel 16 from one lateral opening 18 to the other lateral opening 18 is set so as to be equal or slightly greater than the length of the shrinked protective sleeve 101. Preferably, all the inclined channels 16 present the same extent between the two lateral openings 18.

Each inclined channel 16 can be ideally divided into a first portion 16*a*, a second portion 16*b*, and a third portion 16*c* all extending between the two lateral openings 18. The first portion 16*a* is positioned between the second 16*b* and the third portion 16*c* and realizes a central portion for the inclined channel 16. The splice 100 or splices 100 are substantially contained in the first portion 16*a*.

The first portion 16*a* presents a cross section area substantially constant along the whole first portion 16*a* (FIG. 4). Such a cross section area is measured along a reference plane RP perpendicular to the first direction D1 and thus represents the passage area of the inclined channel 16. The cross section area is configured to allow the passage of the splices 100 along the first portion 16*a*.

The first portion 16*a* is delimited by a first wall 19 and a second wall 20 that are parallel each other and are parallel to the first direction D1. The first 19 and second wall 20 are spaced apart, along a direction perpendicular to the first direction D1, by a distance L1 that is equal or slightly greater than the diameter of the shrinkable protective sleeve 101 of the splice 100.

Figure 2:
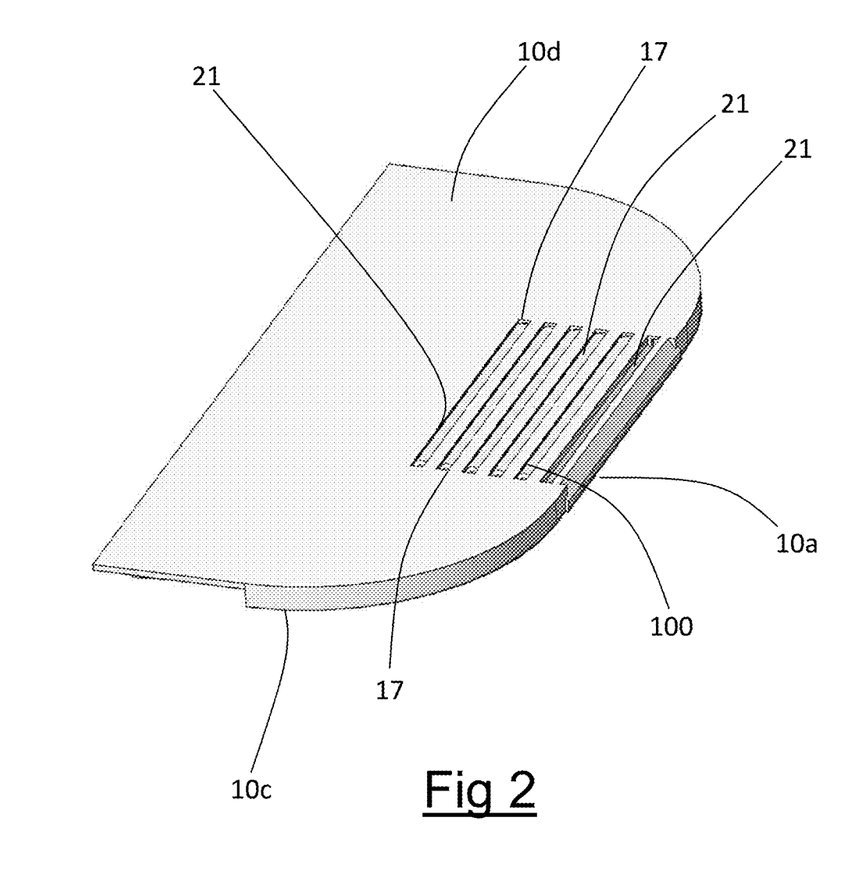
FIG. 2 shows a schematic perspective bottom view of a portion of the high density splice holder tray of FIG. 1 according to an embodiment.
Figure 3:
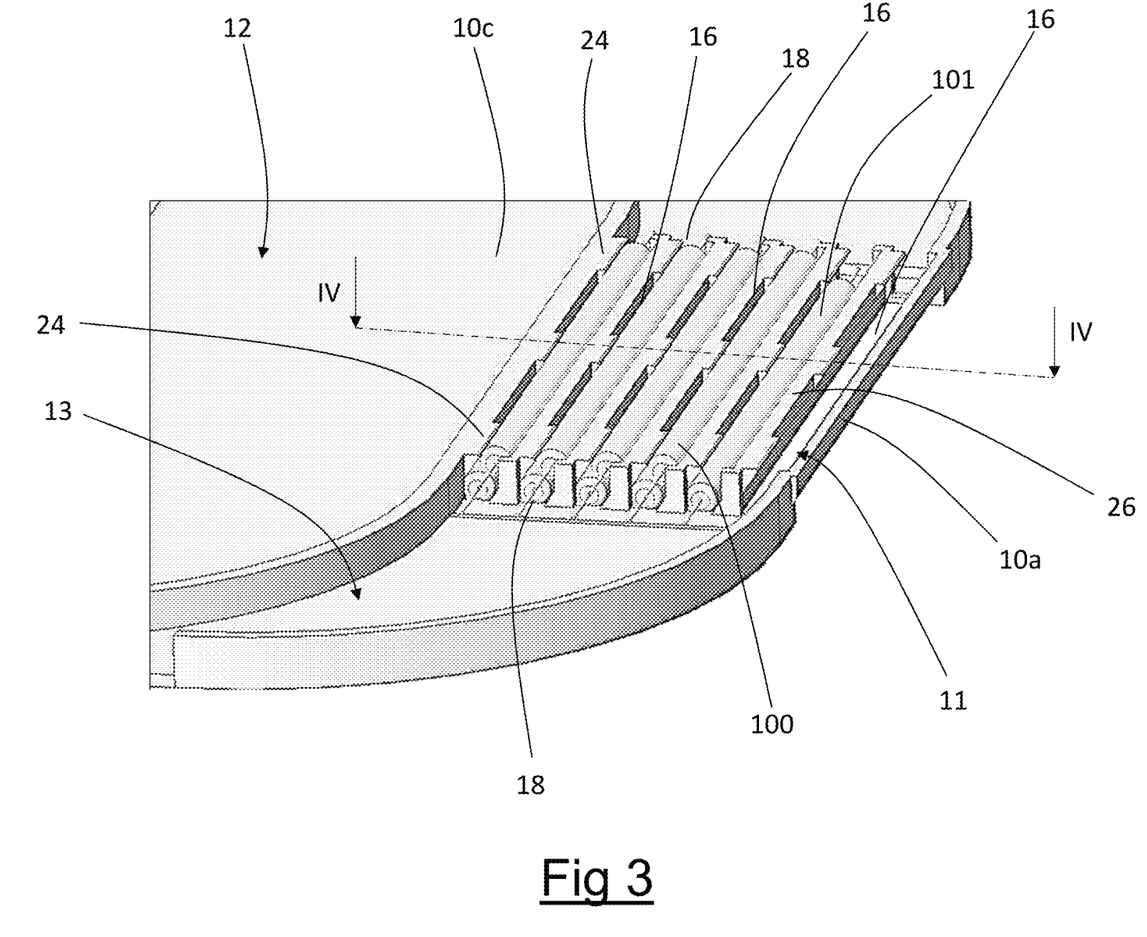
FIG. 3 shows a schematic perspective top view of a portion of the high density splice holder tray of FIG. 1 according to an embodiment.

The second portion 16*b* lies underneath the first portion 16*a* and faces the bottom 10*d* of the splice holder tray 10. At the second portion 16*b* a bottom opening 21 of the inclined channel 16 is provided. The bottom opening 21 longitudinally extends between the two lateral openings 18, as illustrated in FIG. 2.

A part 16*d* of the second portion 16*b* is tapered toward the bottom opening 21, so as to link the first portion 16*a* to the bottom opening 21. In a first embodiment, such a tapered part 16*d* of the second portion 16*b* continuously extends between the two opposite lateral openings 18. In a second embodiment, the tapered part 16*d* of the second portion 16*b* extends for just a portion of the distance between the two opposite lateral openings 18. In a third embodiment, there are at least two tapered parts 16*d* of the second portion 16*b*. In this embodiment, the tapered parts 16*d* are spaced apart to each other and each tapered part 16*d* extends for just a portion of the distance between the two opposite lateral openings 18.

In all the embodiments, the area of the bottom opening 21 is smaller than the cross section area of the first portion 16*a* of the inclined channel 16.

At each tapered part, the second portion 16*b* comprises a third wall 22 extending from the first wall 19 and reaching the bottom opening 21. The third wall 22 forms an angle with the first wall 19. In particular, the third wall 22 is parallel to a second direction D2 that forms an angle comprised from about 95° to about 175° with the first direction D1. In the preferred embodiment, the second direction D2 forms an angle comprised from about 120° to about 150°, preferably of about 135°, with the first direction D1. In the preferred embodiment, the third wall 22 has a projected length PL on the reference plane RP that is slightly smaller than an half of the distance L1. Preferably, the second direction D2 is substantially parallel to a vertical direction.

At each tapered part, the bottom opening 21 is delimited by a free edge of the third wall 22 and by a free edge of the second wall 20, namely by the end free portions of the second 20 and third wall 22, as depicted in the example of FIG. 4. The distance L2 between the free edge of the third wall 22 and the free edge of the second wall 20, namely the extent of the bottom aperture 21 along a direction perpendicular to the longitudinal extent of the bottom opening 21, is smaller than the distance L1 that separates the first 19 and second wall 20. Therefore, a splice 100 cannot completely pass through the bottom opening 21. The distance L2 is set so as to let the splice 100, facing the bottom opening 21, to slightly go beyond the bottom opening 21. In particular, the splice 100 facing the bottom opening 21 emerges by an extent E1 from the bottom opening 21.

The extent E1 is selected so that, when two splice holder trays 10 are mounted in a superposed condition, the top splice of a splice holder tray contacts or is spaced apart from a distance comprised between 0.05 millimeter and 0.5 millimeter from the bottom splice of the underneath splice holder tray.

In the preferred embodiment such an extent E1 is comprised from about 0.1 millimeter to about 1 millimeter, preferably of about 0.3 millimeter.

By selecting the projected length PL of the third wall 22 and the angle between the first wall 19 and the third wall 22, it is possible to determine the distance L2 suitable for allowing the splice 100 to protrude from the bottom opening 21 by the desired extent E1.

The third portion 16c lies above the first portion 16a and faces the top 10c of the splice holder tray 10. At the third portion 16c a top opening 23 of the inclined channel 16 is provided. The top opening 23 longitudinally extends between the two lateral openings 18. The top opening 23 is designed for inserting the splices 100 into the inclined channel 16.

The top opening 23 can be entirely realized by the free end edge of the first 19 and second wall 20, so as to present the same cross area of the first portion 16a of the inclined channel 16. In this case the splices can be freely inserted, namely without any obstacle, in the inclined channel 16 from the top opening 23.

In the preferred embodiment, the third portion 16c is provided with at least one tapered part 24, more preferably with at least three tapered parts 24. The tapered part 24 extends for just a portion of the distance between the two lateral openings 18. In the preferred embodiment, it is provided a first tapered part 24 positioned equidistant from both the two lateral openings 18, a second tapered part 24 close to one of the two lateral openings 18 and a third tapered part 24 close to the other of the two lateral openings 18, as illustrated in FIG. 1.

The area of the top opening 23 in correspondence of each tapered part 24 is smaller than the cross section area of the first portion 16a of the inclined channel 16, while the area of the top opening 23 not interested by a tapered part 24 is equal to the cross section area of the first portion 16a of the inclined channel 16.

At each tapered part 24, the third portion 16c comprises a fourth wall 25 extending from the second wall 20 and reaching the top opening 23. The fourth wall 25 forms an angle with the second wall 20. In particular, the fourth wall 25 is parallel to a third direction D3 that forms an angle comprised from about 95° to about 175° with the first direction D1. In the preferred embodiment, the third direction D3 forms an angle comprised from about 120° to about 150°, preferably of about 135°, with the first direction D1. Preferably, the third direction D3 is substantially parallel to a vertical direction and it is parallel to the second direction D2.

At each tapered portion 24, the top opening 23 is delimited by a free edge of the fourth wall 25 and by a free edge of the first wall 19, namely by the end free portions of the first 19 and fourth wall 25, as depicted in FIG. 4. The distance L3 between the free edge of the fourth wall 25 and the free edge of the first wall 19, namely the extent of the top aperture 23 (at any tapered part 24) along a direction perpendicular to the longitudinal extent of the top opening 23, is smaller than the distance L1 that separates the first 19 and second wall 20. Preferably, the distance L3 is identical to the distance L2 above cited.

In order to allow the splices 100 to enter the inclined channel 16 through the top opening 23, the tapered parts 24 are elastically deformable.

To this end, each fourth wall 25 is integral with a relative partition wall 26 that separates two adjacent inclined channels 16.

Each partition wall 26 extends from the top 10c to the bottom 10d of the splice holder tray 10. Each partition wall 26 is delimited, from one end, by the first 19 and third wall 22 of an inclined channel 16 and, from the other end, from the second 20 and fourth wall 25 of an adjacent inclined channel 16, as illustrated in FIG. 4.

The thickness L4 of each partition wall 26 measured along a direction perpendicular to the first direction D1 and at a middle portion 26a of the partition wall 26 is smaller than the distance L1 between the first 19 and second wall 20 of an inclined channel 16 measured along the same direction. The middle portion 26a of the partition wall 26 is underneath the tapered part 24.

The thickness L4 is selected for allowing the partition wall 26 and thus the tapered part 24 to be elastically deformed (without being broken or damaged) and divaricated up to an extent suitable for preventing the splices 100 from being stopped by the tapered part 24 and for allowing the splices 100 to enter the inclined channel 16. The thickness L4 also depends on the material used for realizing the partition wall 26. Once the splices 100 are inserted into the inclined channel 16, the tapered part 24, along with the whole partition wall 26, regains their original shape, and avoids the splices 100 from passing through the top opening 23 and from leaving the inclined channel 16.

In the preferred embodiment, the distance L3 between the free edge of the fourth wall 25 and the free edge of the first wall 19 at any tapered part 24 is selected so as to let the splice 100 already inserted into the inclined channel 16 and facing the top opening 23 to slightly go beyond the top opening 23, as illustrated in FIG. 4. In particular, the splice 100 facing the top opening 23 emerges by an extent E2 from the top opening 23.

The extent E2 is selected so that, when two splice holder trays 10 are mounted in the superposed condition, the top splice of the undermost splice holder tray contacts or is spaced apart from a distance comprised between 0.05 millimeter and 0.5 millimeter from the bottom splice of the uppermost splice holder tray.

In the preferred embodiment such an extent E2 is comprised from about 0.1 millimeter to about 1 millimeter, preferably from about 0.3 millimeter. The extent E2 is preferably identical to the extent E1 above cited.

By selecting the extent of the fourth wall 25 and the angle between the second wall 20 and the fourth wall 25, it is possible to determine the distance L3 suitable for allowing the splice 100 to protrude from the top opening 23 by the desired extent E2.

Figure 5:
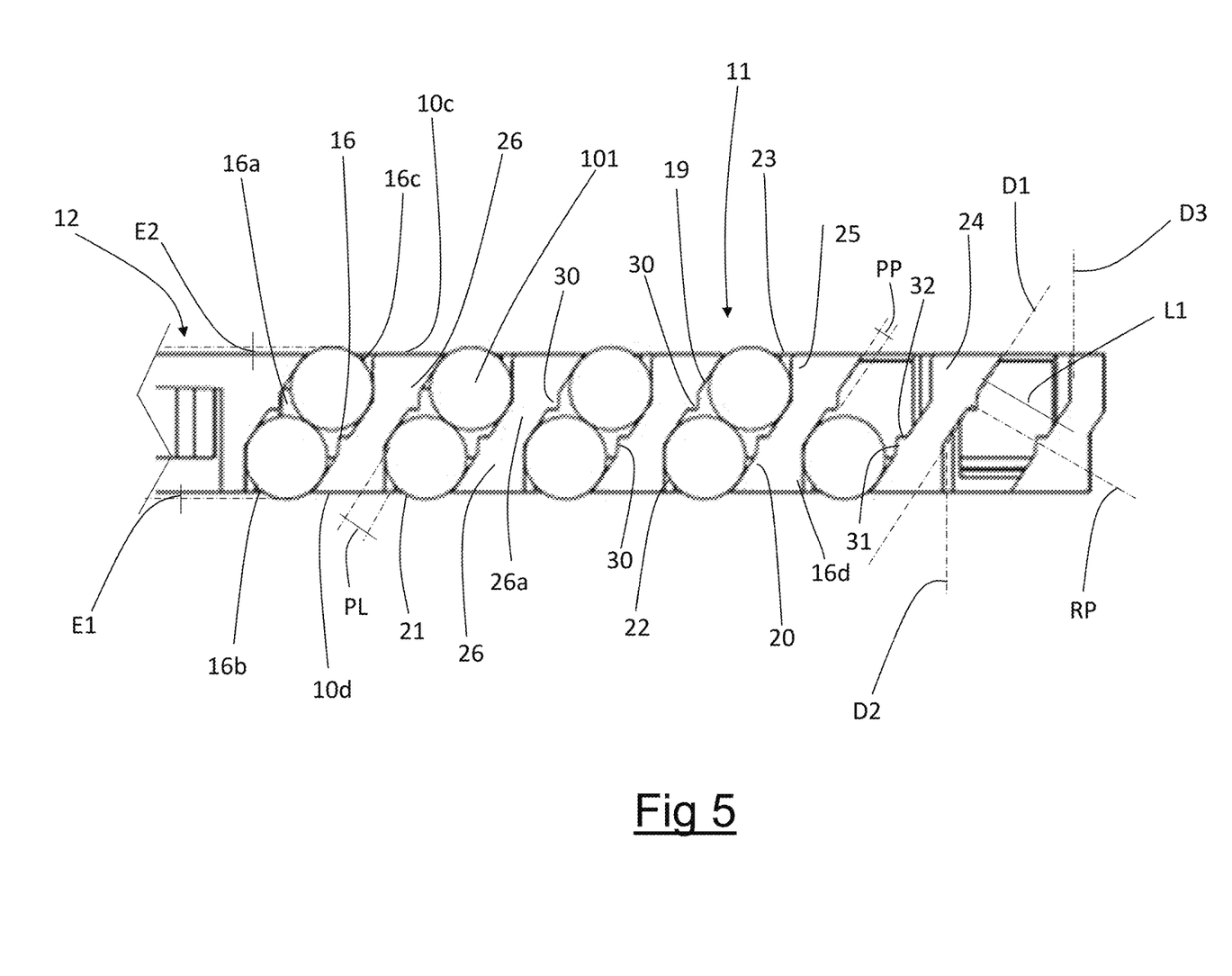
FIG. 5 is the schematic section view of FIG. 4 in an alternative embodiment.

Optionally the first wall 19, the second wall 20, or both the first and second walls 19, 20 may be provided with at least one protrusion 30, more preferably with at least three protrusions 30, as depicted on FIG. 5. Each protrusion 30 extends for just a portion of the distance between the two lateral openings 18.

Preferably, each protrusion 30 comprises a first protrusion wall 31 parallel to the second direction D2 and a second protrusion wall 32 perpendicular to the second direction D2, thus forming a step wise pattern on the first and second walls 19, 20.

Each protrusion 30 has a length PP in a direction perpendicular to the first direction D1 that is smaller than an half of the distance L1.

The protrusion 30 avoid that a splice 100 can move in the channel 16 in cases where only one splice 100 is installed in a channel 16.

What is claimed is:
1. A splice holder tray comprising:
a splice holder section comprising a plurality of inclined channels, each of the plurality of inclined channels including:
a first portion presenting a cross section area that is measured on a reference plane,
two opposite lateral openings, and a top opening and a bottom opening, wherein the bottom opening has an area smaller than the cross section area, wherein each of the plurality of inclined channels further comprises a second portion and a third portion, and wherein the first portion is adjacent to the second portion and to the third portion, the bottom opening being provided on the second portion, and wherein the bottom opening extends between the two opposite lateral openings of each of the plurality of inclined channels, and wherein at least two parts of each of the plurality of inclined channels are tapered at the second portion, the tapered part being spaced apart to each other along a direction extending between the two opposite lateral openings of each of the plurality of inclined channels.

2. The splice holder tray according to claim 1, wherein the bottom opening extends between the two opposite lateral openings of each of the plurality of inclined channels.

3. The splice holder tray according to claim 1, wherein at least a part of each of the plurality of inclined channels is tapered at the second portion.

4. The splice holder tray according to claim 1, wherein the first portion of each of the plurality of inclined channels is delimited by a first wall and a second wall parallel to the first wall and extending along a first direction, the cross section area being measured along a reference plane perpendicular to the first direction.

5. The splice holder tray according to claim 4, wherein each tapered part of the second portion is delimited by a third wall extending from the first wall along a second direction inclined with respect to said first direction.

6. The splice holder tray according to claim 5, wherein the third wall has a projected length on the reference plane that is slightly smaller than an half of the distance between the first wall and the second wall measured along a direction perpendicular to the first direction.

7. The splice holder tray according to claim 4, wherein the first wall comprises a protrusion projecting toward the second wall.

8. The splice holder tray according to claim 1, wherein the third portion of each of the plurality of inclined channels comprises at least one tapered part.

9. The splice holder tray according to claim 8, wherein the first portion of each of the plurality of inclined channels is delimited by a first wall and a second wall parallel each other and extending along a first direction, the cross section area being measured along a reference plane perpendicular to the first direction, and wherein the tapered part of the third portion is delimited by a fourth wall extending from the second wall along a third direction inclined with respect to said first direction.

10. The splice holder tray according to claim 8, further comprising a plurality of partition walls each of which is provided between an inclined channel and an adjacent inclined channel, wherein each partition wall is elastically deformable at least at the third portion of the inclined channel.

11. The splice holder tray according to claim 1, further comprising a plurality of partition walls each of which is provided between an inclined channel and an adjacent inclined channel.

12. The splice holder tray according to claim 11, wherein the first portion of the inclined channel is delimited by a first wall and a second wall parallel each other and extending along a first direction, the cross section area being measured along a reference plane perpendicular to the first direction, and wherein the thickness of each partition wall measured along a direction perpendicular to the first direction is smaller than the distance between the first wall and the second wall of a inclined channel measured along the same direction.

13. The splice holder tray according to claim 1, further comprising a storage section configured for storing lengths of optical fibers, and two opposite routing sections positioned between the splice holder section and the storage section.

14. A splice holder tray comprising:
a storage section comprising optical cable tracks for optical cables to be spliced to enter the storage section;
a splice holder section comprising a plurality of inclined channels for holding spliced optical fibers, each of the plurality of inclined channels including:
a first portion presenting a cross section area that is measured on a reference plane,
two opposite lateral openings for exiting the spliced optical fibers, and
a top opening and a bottom opening, wherein the bottom opening has an area smaller than the cross section area; and
routing sections to route the optical cable tracks from the storage section to the splice holder section,
wherein each of the plurality of inclined channels further comprises a second portion and a third portion, and wherein the first portion is adjacent to the second portion and to the third portion, the bottom opening being provided on the second portion, and
wherein the bottom opening extends between the two opposite lateral openings of each of the plurality of inclined channels, and wherein at least two parts of each of the plurality of inclined channels are tapered at the second portion, the tapered part being spaced apart to each other along a direction extending between the two opposite lateral openings of each of the plurality of inclined channels.

15. The splice holder tray according to claim 14, wherein at least a part of each of the plurality of inclined channels is tapered at the second portion.

16. The splice holder tray according to claim 14, wherein the first portion of each of the plurality of inclined channels is delimited by a first wall and a second wall parallel to the first wall and extending along a first direction, the cross section area being measured along a reference plane perpendicular to the first direction.

17. The splice holder tray according to claim 14, further comprising a plurality of partition walls each of which is provided between an inclined channel and an adjacent inclined channel.

18. A splice holder tray comprising:
a splice holder section comprising a plurality of inclined channels, each of the plurality of inclined channels including:
a first portion presenting a cross section area that is measured on a reference plane,
two opposite lateral openings, and
a top opening and a bottom opening, wherein the bottom opening has an area smaller than the cross section area,
wherein each of the plurality of inclined channels further comprises a second portion and a third portion, and wherein the first portion is adjacent to the second portion and to the third portion, the bottom opening being provided on the second portion, wherein at least a part of each of the plurality of inclined channels is tapered at the second portion, wherein the first portion of each of the plurality of inclined channels is delimited by a first wall and a second wall parallel to the first wall and extending along a first direction, the cross section area being measured along a reference plane perpendicular to the first direction, and wherein each tapered part of the second portion is delimited by a third wall extending from the first wall along a second direction inclined with respect to said first direction.

19. The splice holder tray according to claim 18, wherein the third wall has a projected length on the reference plane that is slightly smaller than an half of the distance between the first wall and the second wall measured along a direction perpendicular to the first direction.

20. The splice holder tray according to claim 18, wherein the third portion of each of the plurality of inclined channels comprises at least one tapered part.

* * * * *